United States Patent [19]

Hensley et al.

[11] 4,257,200
[45] Mar. 24, 1981

[54] COTTON MODULE TARPAULIN PIN

[76] Inventors: Clifford A. Hensley, P.O. Box 359, Agua Dulce, Tex. 78330; Keith G. Adams, Rte. 1, Box 150, Robstown, Tex. 78380

[21] Appl. No.: 41,184

[22] Filed: May 21, 1979

[51] Int. Cl.³ .......................... E04D 1/34; F16B 15/00
[52] U.S. Cl. .......................................... 52/4; 411/470; 206/83.5
[58] Field of Search ............................. 52/3–5; 85/29, 49; 206/83.5, 442

[56] References Cited

U.S. PATENT DOCUMENTS

| | | |
|---|---|---|
| 153,035 | 7/1874 | Baldwin .............................. 206/83.5 |
| 322,045 | 7/1885 | Dean ........................................ 52/4 |
| 388,795 | 8/1888 | Symmes . |
| 1,555,322 | 9/1925 | Kleinhesselink ................ 135/15 PE |
| 1,871,571 | 8/1932 | Weber ....................................... 52/3 |
| 2,314,481 | 3/1943 | Crooks .................................. 85/49 X |
| 2,533,062 | 12/1950 | Spink .................................... 85/29 X |
| 2,705,557 | 4/1955 | Hartman .............................. 206/83.5 |
| 3,431,924 | 3/1969 | Simpson . |

FOREIGN PATENT DOCUMENTS 637479 5/1950 United Kingdom ........................... 52/4

Primary Examiner—Alfred C. Perham
Attorney, Agent, or Firm—Harvey B. Jacobson

[57] ABSTRACT

A cotton module is covered with a tarpaulin for protection from the elements. The tarpaulin has a plurality of grommets spaced along the peripheral edge thereof. A separate pin is inserted through each of the grommets and held in place by pressure from the fibrous material of the cotton module. Each pin includes a first elongated leg having a sharpened tip which is inserted through the grommet and into the cotton module. A second leg is approximately one-fourth the length of the first leg and extends parallel to the first leg. The second leg is inserted into the cotton module alongside the peripheral edge of the tarpaulin. A bight portion runs between the first and second legs and is devoid of any protrusions which might cause the pin to be knocked loose as the cotton module is transported.

5 Claims, 3 Drawing Figures

COTTON MODULE TARPAULIN PIN

BACKGROUND OF THE INVENTION

1. Field of the Invention

This invention relates to tarpaulin pins and especially to such pins which are adapted for use in holding a tarpaulin upon the body of a cotton module.

2. Description of Related Art

In recent years, the practice has evolved whereby cotton is harvested and pressure formed into self-sustained cotton modules for transportation to areas of use. In order to protect these cotton modules from deterioration due to contact with the elements, it is advantageous to provide some form of covering or tarpaulin over the top of the cotton module. A problem has developed whereby tarpaulins used to cover the cotton modules are prone to flap in the wind and become loosened from their attachments to the cotton module itself. Accordingly, a need has developed for a simple, effective means of securing the tarpaulin to the cotton module.

A plurality of stakes have been used in the past for holding down tents, tarpaulins, and the like. For instance, U.S. Pat. No. 388,795, issued Aug. 28, 1888, to Symmes et al shows a hood for use as a weather shield for hay or grain. The hood is held on the material to be protected by a plurality of ropes, with each rope being attached to a separate stake. Each stake has a pair of diverging members with one member being forced into the ground. U.S. Pat. No. 3,431,924, issued Mar. 11, 1969, to Simpson, shows a tent stake having a pair of legs which are forced into the ground. One leg is substantially longer than the other and the legs are interconnected by a bight portion having a helical loop for connection to a tie-down line. Neither of the above devices would be suitable for use in a cotton module as they contain protrubances which cause them to be knocked loose from the module.

SUMMARY OF THE INVENTION

One object of the present invention is to provide a simple, inexpensive, yet effective device for connecting a tarpaulin to a cotton module.

A further object of the present invention is to provide a cotton module tarpaulin pin which, when inserted into the cotton module, contains a minimum number of protrubances which can be knocked about by the tarpaulin flapping in the wind and to loosen the pin from engagement with the cotton module.

In accordance with these objects, a cotton module tarpaulin pin is provided which has a first elongated leg portion having a free end with a sharpened tip for insertion into a cotton module and having a length of 20 inches or more. A second, substantially smaller leg, having a length of three inches or more and also including a sharpened free end is connected to the first leg by a relatively straight bight portion which extends laterally between the legs. When a cotton module is covered with a tarpaulin having a plurality of spaced grommets along the peripheral edge of the tarpaulin, a cotton module tarpaulin pin is inserted through each grommet. The first leg of the pin is inserted through the grommet and pressed into the cotton module. The pin is angled upwardly within the cotton module and positioned so that the bight of the pin extends from the grommet past the peripheral edge of the tarpaulin. The second leg is inserted directly into the cotton module at a position directly adjacent to the tarpaulin peripheral edge. With a pin disposed in each grommet, the tarpaulin is securely engaged with the cotton module and can be easily transported.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 3:
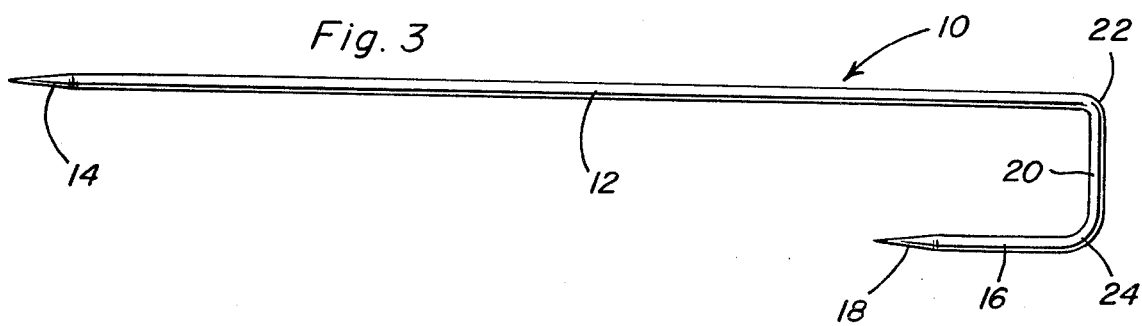
FIG. 3 is an elevational view of one cotton module tarpaulin pin of the present invention.

Now with reference to the drawings, a cotton module pin incorporating the principles and concepts of the present invention and generally referred to by the reference numeral 10 will be described in detail. With particular reference to FIG. 3, it will be seen that the cotton module tarpaulin pin includes a first elongated leg 12 having a generally cylindrical configuration and terminating in a sharpened free end 14. Leg 12 should be at least 20 inches in length and in actual practice is made in a length of 24 inches. A second leg 16 also terminates in a free end 18 which is sharpened to a point. Leg 16 should be at least 3 inches in length and in actual practice is produced in a length of 6 inches. Legs 12 and 16 extend parallel to each other and are interconnected by bight 20 which extends substantially linearly between the legs. The entire pin 10 is produced from, preferably, hot rolled steel and bent at radii 22 and 24 to form the legs and bight thereof. Afterwards, the ends 14 and 18 are sharpened to facilitate insertion of the pin in a cotton module.

Figure 1:
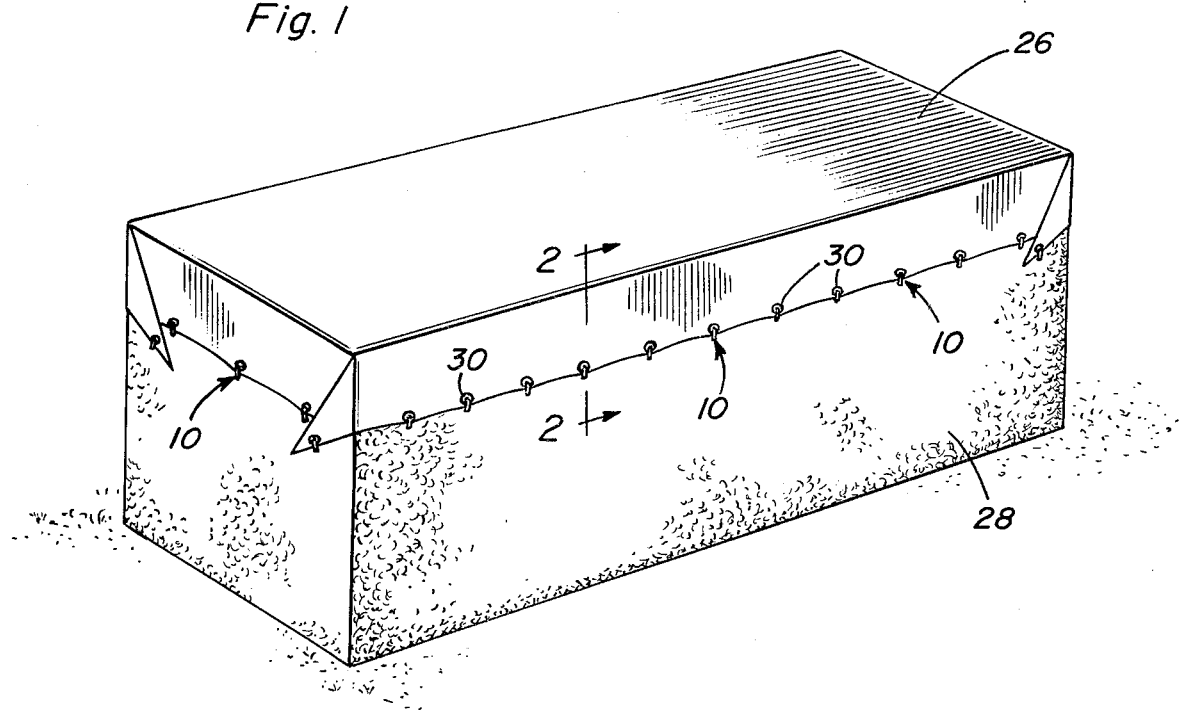
FIG. 1 is a perspective view of a cotton module with tarpaulin secured thereover by a plurality of pins of the invention.
Figure 2:
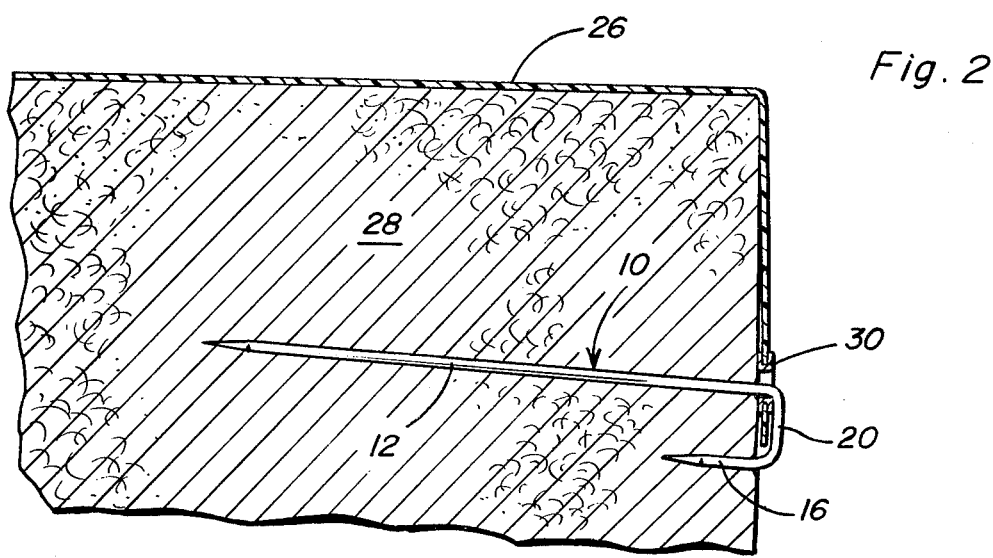
FIG. 2 is an elevational sectional view taken substantially along a plane passing through section line 2—2 of FIG. 1 and showing the manner of insertion of the cotton module pin.

Now with reference to FIGS. 1 and 2, it can be seen that a tarpaulin 26, which is normally produced from thermoplastic material or canvas, is used to cover the top of a cotton module 28 and folded down along the sides thereof. Cotton module 28 is formed in a standard cotton compacting process whereby the cotton is subjected to high pressures causing the formation of a substantially rectangular module configuration as shown. The tarpaulin contains a plurality of $\frac{3}{8}$ inch grommets 30 which are fastened along the marginal portion of the tarpaulin by any known method. The tarpaulin is fastened to the cotton module by insertion of one pin 10 through each of the grommets. As is evident from the figures, the longer leg 12 of the pin is inserted through the grommet 30 and is angled upwardly within the cotton module. The shorter leg 16 is inserted into the cotton module adjacent the free end of the tarpaulin, thereby causing bight 20 to lock the free end of the tarpaulin tightly against the cotton module. In actual practice, the bight 20 is 3 inches in length and the entire pin is 5/16 inch in diameter. Accordingly, with the pins inserted as described, only a small portion of the pin protrudes from the cotton module and is subjected to external forces which might cause loosening of the pin within the module. Furthermore, with the pin upwardly canted within the module, upward forces caused by lifting of the tarpaulin by wind pressure as the module is being transported cannot cause pin removal from the module. Likewise, with the peripheral edge of the tarpaulin locked against the cotton module, the free edge is inhibited from flapping in the wind and causing loosening of the pin 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a cotton module having a covering means for covering and protecting said module, said covering means having a peripheral edge with grommets positioned thereon and laying adjacent said module; a holddown pin comprising a first elongated leg having a sharpened free end and being inserted into said module through a grommet of said covering means near said peripheral edge, a second leg having a sharpened end and being inserted directly into said module at a position adjacent said peripheral edge, and a linear bight portion extending between and integrally connected to said first and second legs for locking said peripheral edge against said cotton module.

2. The combination of claim 1 wherein said first leg has a length of at least 20 inches.

3. The combination of claim 2 wherein said second leg has a length of at least 3 inches.

4. The combination of claim 3 wherein said pin is formed from hot rolled steel.

5. A pin formed from hot rolled steel for use with a tarpaulin having grommets on a peripheral edge thereof so as to facilitate the securing of said tarpaulin to the top of a cotton module to prevent said tarpaulin from being loosened from said cotton module while said cotton module is being transported, said pin comprising: a first elongated leg having a length greater than twenty inches and terminating in a sharpened free end to facilitate insertion into said cotton module through a grommet positioned proximate to said peripheral edge; a second elongated leg, said second elongated leg being substantially shorter than said first elongated leg and having a length greater than three inches, said second elongated leg extending parallel to said first elongated leg and terminating in a sharpened free end to facilitate insertion into said cotton module proximate to said peripheral edge; a bight portion, said bight portion being substantially linear in configuration and extending laterally of said first and second legs so as to overlie a portion of said tarpaulin extending between a grommet and said peripheral edge, said bight portion being approximately three inches in length and being integrally attached to said first elongated leg at a first curved connection point and to said second elongated leg at a second curved connection point, said first curved connection point substantially conforming to and abutting against an arcuate surface defined by a grommet thereby to minimize the extent of projection of said bight portion outwardly from said cotton module when said pin is in a position securing said tarpaulin to said cotton module.

* * * * *